United States Patent Office 3,729,435
Patented Apr. 24, 1973

3,729,435
CATHODICALLY DEPOSITABLE COATING MATERIALS
Gerhard Bachmann, Ludwigshafen, and Matthias Marx, Bad Durkheim, Germany, assignors to Badische Anilin- & Soda-Fabrik Aktiengesellschaft, Ludwigshafen (Rhine), Rhineland-Pfalz, Germany
No Drawing. Filed June 8, 1970, Ser. No. 44,599
Claims priority, application Germany, June 19, 1969,
P 19 30 949.0
Int. Cl. C08g 45/08, 45/10
U.S. Cl. 260—18 EP
2 Claims

ABSTRACT OF THE DISCLOSURE

Cathodically depositable coating materials containing a condensation product which is soluble or dispersible in water, which is at least partly in the form of a salt of a water-soluble carboxylic acid, and which has been obtained by condensation of (a) a polyfunctional aminoalcohol containing tertiary nitrogen atoms with (b) a mixture of monocarboxylic acids and polycarboxylic acid compounds and (c) a phenolic or amino resin which may be etherified.

---

The present invention relates to cathodically depositable coating materials which contain a condensation product having a nitrogen-containing basic group which is at least partly neutralized with a carboxylic acid.

The cathodic deposition of coatings has the advantage over the anodic method, in which salts of polymers containing carboxylic groups are usually used, that at the articles which are made the cathode hydrogen is evolved which has scarcely any effect on the polymer of the coating material, whereas in anodic deposition nascent oxygen is liberated which can effect chemical change in the polymer and, moreover, metal ions may pass into solution and cause discoloration of the coating and decrease the resistance of the coating to water.

Processes for the production of coatings on electrical conduction articles in which the polymers are cathodically deposited from aqueous solutions or dispersions of salts of nitrogen-containing basic cationic polymers onto the conducting articles and then baked are known from U.S. patent specifications Nos. 3,454,492, 3,455,806, 3,446,723 and 3,458,420.

Coating materials hitherto developed for cathodic deposition have a number of disadvantages as regards the properties of the coatings prepared with them. Particularly the adherence of the coatings to the substrate and their resistance to corrosion are in need of improvement.

It is therefore an object of the present invention to provide coating materials which can be advantageously applied by cathodic deposition. Another object of the invention is to provide coatings obtained with such coating materials having particularly advantageous properties, i.e. coatings which not only have the necessary hardness and elasticity, but also exhibit in particular good adherence to the substrate and good corrosion resistance.

According to the present invention a cathodically depositable coating material contains a condensation product of:

(a) 40 to 75% by weight of a polyfunctional aminoalcohol having tertiary nitrogen atoms and which may contain epoxy groups;
(b) 10 to 30% by weight of a mixture of at least one monocarboxylic acid having seven to twenty-four carbon atoms and an adduct, polycondensate or polymer containing at least two carboxylic groups per molecule; and
(c) 5 to 40% by weight of at least one conventional phenolic or amino resin which may have been etherified with an alcohol;

which is soluble in water or dispersible in water and is at least partly in the form of a salt of a water-soluble carboxylic acid.

The following details are given concerning the components of the cationic nitrogen-containing basic condensation products according to the invention.

(a) Suitable polyfunctional aminoalcohols having tertiary nitrogen atoms are preferably reaction products of epoxy resins with secondary amines. Epoxy resins suitable for the purpose are conventional compounds, particularly those which have been obtained by etherification of compounds containing at least two hydroxyl groups as functional groups, such as polyhydric alcohols and phenols, particularly dihydric alcohols and phenols, with epichlorohydrins or dihalohydrins in the presence of alkali.

Examples of dihydric alcohols or phenols suitable for the production of such epoxy resins are glycols such as ethylene glycol, diethylene glycol, triethylene glycol, propylene glycol-1,2, propylene glycol-1,3, butylene glycol-1,4, pentanediol-1,5 and hexanediol-1,6. Dihydric phenols such as resorcinol, pyrocatechol, hydroquinone, 1,4-dihydroxynaphthalene, bis(4-hydroxyphenyl)methane, bis(4-hydroxyphenyl)methylphenylmethane, bis(4 - hydroxyphenyl)tolylmethane, 4,4'-dihydroxydiphenyl and 2,2-bis (4-hydroxyphenyl)propane are particularly advantageous.

Polymeric 2,2 - bis(4-hydroxyphenyl)propane glycidyl ethers having an epoxy number of 0.02 to 0.6, preferably from 0.20 to 0.25, are particularly suitable.

Polyglycidyl ethers of trihydric and higher polyhydric alcohols, for example glycerol, trimethylolpropane, trimethylolethane or pentaerythritol, are also suitable.

The production of such epoxides or epoxy resins and other representatives of this class of substances are described by A. M. Paquin, "Epoxidverbindungen and Epoxidharze" Springer-Verlag, Berlin-Heidelberg-Gottingen, 1958.

Suitable secondary amines are the conventional ones, particularly those containing two identical or different alkyl radicals having one to twenty carbon atoms in linear or branched arrangement; the alkyl radicals in turn may contain further substituents, for example hydroxy groups, alkoxy groups or halogen atoms.

Secondary amines having hydroxyalkyl groups, for example diethanolamine, diisopropanolamine and di-n-propanolamine, are especially suitable.

Cyclic secondary amines, for example pyrrolidine, piperidine and morpholine, may also be used.

The epoxy resins are reacted with the secondary amines advantageously in a ratio of 1:0.5 to 1:1, preferably from 1:0.7 to 1:1, with reference to epoxy groups:amine nitrogen, at temperatures of from 30° to 150° C., particularly from 70° to 120° C., in the presence or absence of solvents which cannot react with the reaction components under the reaction conditions, for example glycol ethers. Since the reaction is exothermal, the amine is advantageously not all added at once but gradually to the epoxy compound, and the whole is allowed to react for some time (about thirty minutes). It is particularly advantageous for example to use the reaction product of the condensation polymer of 2,2-bis(4-hydroxyphenyl)propane and epichlorohydrin having an epoxy value of 0.20 to 0.225 and diethanolamine which has been prepared in the absence of solvents at 80° to 120° C.

(b) Suitable monocarboxylic acids having seven to twenty-four carbon atoms include aliphatic, aromatic, araliphatic and polycyclic monocarboxylic acids, preferably saturated or unsaturated fatty acids having ten to twenty-two carbon atoms, resin acids and mixtures of the said monocarboxylic acids. The following are given as examples of carboxylic acids to be used according to the invention: carboxylic acids or mixtures thereof such as are obtained in the hydrolysis of animal or vegetable fats or oils, for example lauric, myristic, palmitic, stearic, oleic, linoleic, linolenic, eleostearic and ricinoleic acids, conversion products of natural fatty acids, for example isomerized fatty acids of linseed oil, dehydrated fatty acids of castor oil, hydrogenated oil fatty acids, acids of tall oil and tall oil distillates, resin acids of colophony and their conversion products. Ricinoleic acids and dehydrated ricinoleic acids and distilled tall oil having a resin acid content of from 25 to 30% are preferred.

Adducts, polycondensates or polymers containing at least two carboxylic groups per molecule according to the invention include adducts of unsaturated carboxylic acids, particularly dicarboxylic acids, to compounds containing double bonds such as adducts of maleic acid to unsaturated oils, for example maleinated linseed oil or a polybutadiene oil such as is described in U.K. patent specification No. 1,107,147, polycondensates, for example acid alkyd resins whose production is described for example in French patent specification No. 1,491,616 and in J. Oil Colour Chem. Ass. 47, 10, 767–789 (1964). Particularly suitable are copolymers of monomers containing carboxyl groups such as acrylic acid, methacrylic acid, itaconic acid, maleic acid, hemiesters of maleic acid, with commonly used monomers which are copolymerizable therewith, for examples esters of acrylic acid or methacrylic acid with alcohols having one to eight carbon atoms, acrylamide, methacrylamide, vinyl esters, vinylaromatic compounds, for example styrene, polyenes, particularly dienes such as butadiene or isoprene, and mixtures of these monomers. The copolymers containing carboxylic groups according to the invention may also contain units of other copolymerizable monomers, for example unsaturated oils, and oil fatty acids, for example fatty acids of linseed oil. The mixtures of the substances containing carboxylic groups specified under (b) is composed of from 40 to 90% by weight of monocarboxylic acid and 60 to 10% by weight of an adduct, polycondensate or polymer containing at least two carboxyl groups per molecule; amounts of about 75% by weight of monocarboxylic acid and of about 25% by weight of polycarboxylic acid are particularly advantageous.

(c) Suitable phenolic or amino resins which may be etherified with an alcohol include the conventional ones, particularly condensation products of formaldehyde with melamine and phenols and mixtures of these condensates. The production of these products is carried out in a conventional manner and is described for example in "Chemie der Phenolharze" by K. Hultzsch, Kunststoffrundschau, 7, 433–440 (1960), and J. Appl. Polym. Sci., 11, 1251–1257 (1967). Phenolic or amine resins which are at least partly etherified with an alcohol having one to four, particularly two to four, carbon atoms are especially advantageous.

The production of the condensation product from the components (a), (b) and (c) may be carried out with or without the addition of a solvent. Condensation of the individual components is advantageously carried out in a temperature range of from 120° to 250° C. within a period of from one to six hours. Glycol ether is an example of a solvent which may be used.

It is particularly advantageous first to heat the polyfunctional aminoalcohol (a) with the carboxylic acid having seven to twenty-four carbon atoms specified under (b) at about 150° C. to 200° C. under nitrogen until the acid number has dropped to below 10 and then to add the adduct, polycondensate or polymer containing at least two carboxyl groups per molecule and to effect esterification until an acid number of less than 5 has been achieved. If the polycarboxylic acid is added first, crosslinking to a product which is no longer soluble in acid may readily occur. Troublesome frothing during the esterification can be avoided by adding a few drops of silicone oil. In this way a viscous clear melt is obtained which may best be mixed while still hot with a crosslinkable phenolic or melamine resin and stirred for some time at 50° to 100° C. Resins which dissolve only partly in water are particularly suitable.

A condensation product according to this invention is obtained from 40 to 75% by weight of component (a) from 10 to 30% by weight of component (b) and 5 to 30% by weight of component (c). Condensation products of 50 to 60% by weight of component (a), 15 to 25% by weight of component (b) and 15 to 30% by weight of component (c) are preferred.

Particularly advantageous condensation products according to the invention are obtained for example from 50 to 60 parts of the polyfunctional amino alcohol having tertiary nitrogen atoms which have been obtained from 82 to 86 parts of an epoxy compound having an epoxy number (i.e. the number of moles of epoxide per 100 g. of resin) of about 0.2 with 14 to 16 parts of diethanolamine as component (a), 10 to 20 parts of dehydrated ricinoleic acid or of a mixture of tall oil fatty acid and resin acid and 3 to 8 parts of a copolymer derived from 60 to 80 parts of acrylic and/or methacrylic ester, 5 to 15 parts of acrylic acid, 5 to 15 parts of acrylamide and 5 to 15 parts of an isomerized linseed oil or a copolymer derived from 30 to 40 parts of styrene, 20 to 40 parts of butadiene, 25 to 35 parts of the butyl hemister of maleic acid and 5 to 15 parts of a mixture of tall oil fatty acid and resin acid as component (b) and 20 to 30 parts of a commercial phenolic resin or an etherified melamine resin as component (c).

To obtain a product which is soluble in water, a sufficient amount of a water-soluble carboxylic acid is added to the condensation product prepared from the components (a), (b) and (c) and diluted with deionized water. It is best to add a water-soluble, relatively volatile carboxylic acid such as a low aliphatic carboxylic acid, for example formic acid or acetic acid, or a dicarboxylic acid.

Auxiliaries which can be deposited electrochemically by cataphoresis, such as pigments, soluble dyes, highboiling solvents, flow improvers, stabilizers, antifoams and other auxiliaries and additives, may also be mixed with the aqueous solutions or dispersions of the condensation products which are at least partly in the form of a salt of a water-soluble carboxylic acid.

What is said in the patent specifications referred to above applies with regard to the deposition conditions for the coating materials to be applied by cathodic deposition according to the invention. Deposition is generally carried out at temperatures of from 15° to 40° C. and within a period of from one to two minutes. After the film deposited on the electrically conducting articles has been rinsed, it is baked at about 140° to 200° C. for ten to thirty minutes.

Cathodically depositable coating materials according to the invention give coatings having outstanding mechanical properties, such as great hardness and scratch resistance combined with good elasticity and good adhesion to the metal substrate. They may be deposited at high voltages, for example 350 volts, which is very desirable for achieving good throwing power and adequately thick layers. The resistance of the coatings to corrosion is also excellent. Since compatibility with conventional pigments and the gloss of the coatings are good, it is possible to prepare not only prime coatings but also pale one-coat finishes on various metals because the coatings yellow only slightly when baked.

Another advantage of the coating materials according to the invention is that the effect which may be referred to as the "image formation effect" and which is described in "Farbe und Lack," 75, 4, 327–336 (1969), is completely avoided. This phenomenon occurs in the case of many electrodepositable coating materials and consists in the fact that the images of the openings in a hollow body, e.g. an automobile door, appear in the coating on the outside of the wall opposite the openings. This effect proves to be very troublesome in the electropainting of intricately shaped articles and is very difficult to avoid. It is therefore an important advance in the art to provide an electrodepositable coating material which does not have this disadvantage.

The invention is illustrated by the following examples in which the parts and percentages are by weight.

EXAMPLE 1

150 parts of an epoxy resin which has been obtained by reaction of 2,2-bis(4-hydroxyphenyl)propane with epichlorohydrin and which has an epoxy number of 0.20 to 0.225 and a hydroxyl number of 0.32 (for example Epikote 1001 manufactured by Shell) is melted at 80° to 90° C. and in the course of thirty minutes 33 parts of diethanolamine is dripped in while stirring, the temperature being about 100° C. The whole is then stirred at this temperature for another half hour. Then 50 parts of dehydrated ricinoleic acid (acid number 196; iodine number 170; viscosity 1 poise) is added and the temperature is gradually raised to 180° C. The water formed is continuously removed from the reaction vessel by means of a stream of nitrogen. To avoid troublesome froth, a few drops of silicone oil is added. When the acid number of the mixture has fallen below 5, 15 parts of an 83% copolymer derived from 50 parts of isobutyl acrylate, 20 parts of methyl methacrylate, 10 parts of acrylic acid, 10 parts of acrylamide and 10 parts of an isomerized linseed oil in isopropanol is added in portions. The temperature is kept at 180° C. until the acid number has again fallen below 5. The whole is then allowed to cool to about 100° C., 50 parts of isopropanol is added and the whole is stirred for ninety minutes at 80° C. with 190 parts of an approximately 45% aqueous solution of a commercial phenolic resin of the resol type. The solids content is 74%. 100 parts of the still warm resin is stirred first while 4.6 parts of glacial acetic acid and then diluted with deionized water to a solids content of 10%. A film is cathodically deposited from this solution on a clean sheet of deep-drawing metal at 70 volts for one minute and baked for twenty minutes at 170° C. A firmly adhering coating having a thickness of 20 microns is obtained which does not flake when bent and is fingernail scratch resistant; it is corroded to the extent of about 80% after 32 days in the salt spray test according to ASTM B 117–64. Flow is further improved by adding 5% of decanol to the bath.

EXAMPLE 2

1050 parts of the epoxy resin specified in Example 1 is first reacted with 231 parts of diethanolamine as described in Example 1. Then 350 parts of a tall oil fraction consisting of 68% of fatty acids and 30% of resin acids and having an iodine number of 145 and an acid number of 175 is added. The whole is stirred under a weak stream of nitrogen at 180° C. until the acid number has fallen below 5, whereupon 115 parts of the 83% copolymer from Example 1 is added and the whole is kept at 180° C. until the acid number has again fallen below 5. It is then allowed to cool to 140° C. and 1050 parts of 55% solution in isobutanol of an almost completely isobutanol-etherified hexamethylolmelamine is added and the whole is stirred for one hour at 90° C. The final solids content of the resin is 87%. 0.5 g. of decanol and 3 g. of glacial acetic acid are added to 115 g. of resin and diluted to a solids content of 10%. A film produced by cathodic deposition for two minutes at 100 volts on a deep-drawing metal sheet is 30 microns in thickness after baking at 170° C. for twenty minutes. The film is fingernail scratch resistant, adheres firmly to the substrate and in the salt spray test according to ASTM–B– 117–64 is corroded to the extent of 80% after 32 days. A resin pigmented to the extent of 20% with Iron Oxide Red 130 BM (product of Farbenfabriken Bayer, Leverkusen) is deposited at 160 volts for two minutes and baked for twenty minutes at 170° C. The coating has a thickness of 25 microns, is fingernail scratch resistant, does not flake when bent has an Erichsen value of less than 10 and exhibits very good adhesion of the metal. In the salt spray test according to ASTM as above it is corroded to the extent of 80% after thirty days.

EXAMPLE 3

In the manner described in Example 2, 150 parts of the epoxy resin described in Example 1 is reacted with 33 parts of diethanolamine and 50 parts of the said tall oil fraction. 35 parts of a maleinated linseed oil having a maleic anhydride content of 7% is then added and the whole is stirred under nitrogen at 180° C. until an acid number of less than 5 has been achieved. The whole is allowed to cool to about 100° C. and mixed with 160 parts of a 55% solution in isobutanol of a melamine resin etherified with isobutanol. The final solids content is 84%. 120 parts of the resin is mixed with 6.4 parts of glacial acetic acid and the whole is diluted with water to a solids content of 10%. A film applied to deep-drawing sheet metal by cathodic deposition for two minutes at 140 volts is baked for twenty minutes at 170° C. The coating which is 22 microns in thickness exhibits very good flow and good adhesion to the substrate, does not flake when bent and is fingernail scratch resistant; after 28 days in the salt spray test according to ASTM B–117–64 the extent of corrosion is 80%.

EXAMPLE 4

In the manner described in Example 2, 600 parts of the epoxy resin of Example 1 is reacted with 132 parts of diethanolamine and 200 parts of the tall oil fraction. Then 200 parts of a copolymer of 35 parts of styrene, 30 parts of the n-butyl hemiester of maleic acid, 30 parts of butadiene and 10 parts of the said tall oil fraction is added and the whole is stirred under nitrogen at 180° C. until the acid number is less than 5. 200 parts of this resin is mixed at about 100° C. with 120 parts of a 55% solution in n-butanol of a melamine resin etherified with n-butanol and the whole is stirred for one hour at 90° C. The final solids content is 33%. 120 parts of this resin has added to it successively 6.3 parts of glacial acetic acid and deionized water and a solids content of 10% is set up. A film applied at 140 volts for two minutes to deep-drawing sheet metal is baked for twenty minutes at 170° C. A coating having a thickness of 16 microns is obtained which does not flake when bent, exhibits good adhesion and good flow, and is fingernail scratch resistant. In the salt spray test according to ASTM–B–117–64 it is corroded to the extent of 80% corrosion after 22 days.

EXAMPLE 5

The condensation product of Example 4 is boiled as described therein with the melamine resin etherified with isobutanol of Example 3, and a 10% aqueous acetic acid solution is prepared. A coating prepared as in Example 4 has the same mechanical properties as the coating of Example 4 but a better salt spray resistance according to ASTM–B–117–64, namely 28 days.

EXAMPLE 6

In the manner described in Example 2, 300 parts of the epoxy resin of Example 1 is reacted with 66 parts of diethanolamine and 55.5 parts of dehydrated ricinoleic acid (acid number 196; iodine number 170; viscosity 1 poise). The further procedure of Example 2 is followed and then 17.8 parts of the 83% copolymer of Example 1 is added. After the acid number has fallen below 5, the whole is cooled to below 140° C. and 89 parts of a 55% solution in isobutanol of a hexamethylolmelamine which is almost completely etherified with isobutanol is added and the whole is stirred for ninety minutes at 80° C. The final solids content of the resin is 92.5%. The resin is pigmented with 20% of Iron Oxide Red 130 BM (product of Farbenfabriken Bayer, Leverkusen) and deposited for two minutes at 160 volts on deep-drawing sheet metal made the cathode. The coating is baked for twenty minutes at 170° C. The coating which is 20 microns in thickness does not flake when bent and has a pendulum hardness of 136", a gloss number of 56 (according to Lange) and adheres well to the metal.

EXAMPLE 7

In the manner described in Example 6, 210 parts of the epoxy resin, 46.2 parts of diethanolamine, 86.5 parts of dehydrated ricinoleic acid, 27.6 parts of the 83% copolymer and 364 parts of the 55% hexamethylolmelamine etherified with isobutanol are reacted together. The final solids content is 75.5%. The resin is pigmented as in Example 6, cathodically deposited and baked. The coating which is 15 microns thick is fingernail scratch resistant, does not flake when bent, has a pendulum hardness of 160", an Erichsen value of 9, and exhibits very good adhersion to the metal and very good flow.

We claim:
1. A cathodically depositable coating composition derived by the steps of:
   (a) reacting at 30–150° C. a member selected from the group consisting of diethanolamine, diisopropanolamine and di-n-propanolamine and polymeric 2,2-bis(4-hydroxyphenyl) propane glycidyl ether having an epoxy number of from 0.02 to 0.6 at a ratio of epoxy groups to amine nitrogen of 1:0.5 to 1:1,
   (b) condensing the reaction product of (a) with ($b_1$) a member selected from the group consisting of ricinoleic acid, dehydrated ricinoleic acid, a mixture of tall oil fatty acids and resin acids and also ($b_2$) a member selected from the group consisting of maleinated linseed oil, maleinated polybutadiene oil, an acid alkyd resin, a copolymer of a member from the group consisting of acrylic acid, methacrylic acid and maleic acid hemiester and at least one other unsaturated monomer, the respective compounds of ($b_2$) having at least two carboxyl groups per molecule,
   (c) condensing at 150–200° C. the condensation product of (a), ($b_1$) and ($b_2$) with a member selected from the group consisting of a resol phenol-formaldehyde resin and a melamine-formaldehyde resin, said resins being at least partially etherified with an alcohol having 1–4 carbon atoms, wherein the reaction product of (a) is reacted with ($b_1$) at 150–200° C. until the acid number falls below 10 and the resultant reaction produced is reacted with ($b_2$) until the acid number falls below 5, said condensation product containing from 40 to 75% by weight of the reaction product of (a), from 10 to 30% by weight of the components ($b_1$) and ($b_2$) in a weight ratio of ($b_1$) to ($b_2$) of 40–90: 60–10, and 5–40% by weight of said etherified resin.

2. A coating composition as claimed in claim 1 wherein ($b_2$) is a member selected from the group consisting of (1) a copolymer of acrylic acid, acrylamide and at least one of acrylic and methacrylic acid esters, and (2) a copolymer of styrene, butadiene, and the butyl hemiester of maleic acid.

References Cited

UNITED STATES PATENTS

| | | | |
|---|---|---|---|
| 3,336,253 | 8/1967 | Wong et al. | 260—29.2 |
| 3,567,668 | 3/1971 | Guldenpfennig | 260—19 |
| 3,563,929 | 2/1971 | Guldenpfennig | 260—23 |
| 3,118,848 | 1/1964 | Lombardi et al. | 260—831 |
| 3,367,991 | 2/1968 | Hicks | 260—831 |
| 3,467,730 | 9/1969 | Hicks | 260—23 |
| 3,449,281 | 6/1969 | Sullivan et al. | 260—29.2 |
| 3,551,517 | 12/1970 | Dowbenko et al. | 260—831 |
| 2,772,248 | 11/1956 | Lieberman et al. | 260—29.2 |
| 2,781,335 | 2/1957 | Cupery | 260—85.7 |
| 3,355,373 | 11/1967 | Brewer et al. | 204—181 |

FOREIGN PATENTS

| | | | |
|---|---|---|---|
| 588,799 | 12/1959 | Canada | 260—18 |

DONALD E. CZAJA, Primary Examiner

E. C. RZUCIDLO, Assistant Examiner

U.S. Cl. X.R.

260—29.3, 29.4 UA, 831, 834; 204—181; 260—19 EP. 19 UA, 21, 23 EP, 23.7 A, 23.7 N